US009219905B1

(12) United States Patent
Georges, III

(10) Patent No.: US 9,219,905 B1
(45) Date of Patent: Dec. 22, 2015

(54) SYSTEMS AND METHODOLOGIES RELATED TO FORMATTING DATA FOR 3-D VIEWING

(71) Applicant: INTEGRITY APPLICATIONS INCORPORATED, Carlsbad, CA (US)

(72) Inventor: James A. Georges, III, Brighton, MI (US)

(73) Assignee: Integrity Applications Incorporated, Carlsbad, CA (US)

( * ) Notice: Subject to any disclaimer, the term of this patent is extended or adjusted under 35 U.S.C. 154(b) by 206 days.

(21) Appl. No.: 13/955,519

(22) Filed: Jul. 31, 2013

Related U.S. Application Data

(60) Provisional application No. 61/695,569, filed on Aug. 31, 2012.

(51) Int. Cl.
*G06K 9/36* (2006.01)
*H04N 13/00* (2006.01)

(52) U.S. Cl.
CPC .............................. *H04N 13/0048* (2013.01)

(58) Field of Classification Search
None
See application file for complete search history.

(56) References Cited

U.S. PATENT DOCUMENTS

| 6,219,435 | B1 | 4/2001 | Horikoshi et al. | |
| 6,246,796 | B1* | 6/2001 | Horikoshi et al. | 382/232 |
| 6,281,994 | B1 | 8/2001 | Horikoshi et al. | |
| 6,982,817 | B1 | 1/2006 | Halldorsson | |
| 6,999,178 | B2 | 2/2006 | Hanson et al. | |
| 7,119,905 | B2 | 10/2006 | Bingham et al. | |
| 7,839,548 | B2 | 11/2010 | Schwerdtner | |
| 7,924,430 | B2 | 4/2011 | Georges, III | |
| 8,199,387 | B1 | 6/2012 | Aye et al. | |
| 8,405,059 | B2 | 3/2013 | Heintzmann et al. | |
| 8,422,799 | B1* | 4/2013 | Witzgall et al. | 382/232 |
| 8,433,158 | B2 | 4/2013 | Menon | |
| 2002/0190922 | A1 | 12/2002 | Tsao | |
| 2005/0270610 | A1 | 12/2005 | Moon | |
| 2006/0192972 | A1 | 8/2006 | Bingham et al. | |
| 2007/0113012 | A1 | 5/2007 | Cable et al. | |
| 2007/0229850 | A1 | 10/2007 | Herber | |
| 2008/0074742 | A1 | 3/2008 | Kim et al. | |
| 2008/0198431 | A1 | 8/2008 | Schwerdtner | |
| 2009/0027686 | A1* | 1/2009 | Georges, III | 356/484 |
| 2009/0086296 | A1 | 4/2009 | Renaud-Goud | |
| 2009/0285463 | A1 | 11/2009 | Otazo | |

(Continued)

FOREIGN PATENT DOCUMENTS

DE   10 2005 023743   5/2005

OTHER PUBLICATIONS

Alfalou, Ayman, and C. Brosseau. "Optical image compression and encryption methods." Advances in Optics and Photonics 1.3 (2009): 589-636.*

(Continued)

*Primary Examiner* — Li Liu
(74) *Attorney, Agent, or Firm* — Knobbe Martens Olson & Bear LLP

(57) ABSTRACT

Image acquisition instruments may be employed to capture images used to produce data for driving 3-D projectors. The data obtained from the image acquisition instruments may be compressed. Projectors may also be used to form 3-D images of the object based on the compressed data after decompressing the data. Accordingly, various embodiments described herein involve the formatting of the data such as compressing the data or un-compressing the data.

24 Claims, 15 Drawing Sheets

(56) References Cited

U.S. PATENT DOCUMENTS

| | | |
|---|---|---|
| 2010/0008597 A1 | 1/2010 | Findlay et al. |
| 2010/0014136 A1 | 1/2010 | Haussler et al. |
| 2010/0033784 A1 | 2/2010 | Renaud-Goud |
| 2010/0110208 A1 | 5/2010 | Gerwe |
| 2010/0149139 A1 | 6/2010 | Kroll et al. |
| 2010/0253769 A1 | 10/2010 | Coppeta et al. |
| 2011/0032337 A1 | 2/2011 | Ramos et al. |
| 2011/0085051 A1 | 4/2011 | Chi et al. |
| 2011/0211036 A1 | 9/2011 | Tran |
| 2011/0304723 A1 | 12/2011 | Betzig |
| 2012/0050460 A1 | 3/2012 | Tsang et al. |
| 2012/0099798 A1 | 4/2012 | Saruta et al. |
| 2012/0162448 A1 | 6/2012 | Au et al. |
| 2013/0286181 A1 | 10/2013 | Betzig et al. |
| 2014/0153692 A1 | 6/2014 | Larkin et al. |

OTHER PUBLICATIONS

James A. Georges, III "Optical spatial heterodyne interferometric Fourier transform technique (OSHIFT) and a resulting interferometer", Advance Wavefront Control: Methods, Devices, and Applications V, Proc. of SPIE vol. 6711, pp. 671104-1-671104-12, 2007.

Aerial 3D Display, obtained from the website http://burton-jp.com/en/index.htm on Feb. 16, 2012.

Buell, W.F., et. al., "Synthetic-Aperture Imaging Ladar," Crosslink Summer, pp. 45-59, Aug. 2004.

Beck, S.M. et. al., "Synthetic-aperture imaging laser radar: laboratory demonstration and signal processing," Applied Optics, vol. 44, No. 35, pp. 7621-7629, Dec. 10, 2005.

Buell, W. et. al., "Demonstration of Synthetic Aperture Imaging Ladar," Laser Radar Technology and Applications X, edited by Gary W. Kamerman, Proc. of SPIE, vol. 5791, pp. 152-166, 2005.

Bashkansky, M., et. al., "Two-dimensional synthetic aperture imaging in the optical domain," Optics Letters, vol. 27, No. 22, pp. 1983-1985, Nov. 15, 2002.

Bashkansky, M., et. al., "Synthetic aperture imaging at 1.5 micron: Laboratory demonstration and potential application to planet surface studies," Highly innovative space telescope concepts edited by H.A. MacEwen, Proc. of SPIE, vol. 4849, pp. 48-56, 2002.

Lucke, R.L., et. al., "Photon-limited synthetic-aperture imaging for planet surface studies," Applied Optics, vol. 41, No. 24, pp. 5084-5095, Aug. 20, 2002.

Marcus, S., "Solid-state laser synthetic aperture radar," Applied Optics, vol. 33, No. 6, pp. 960-964, Feb. 20, 1994.

Rabb, D., et. al., "Distributed aperture Synthesis," Optics Express, vol. 18, No. 10, pp. 10334-10342, May 10, 2002.

Stafford, J.W., et. al., "Experimental demonstration of stripmap holographic aperture ladar system," Applied Optics, vol. 49, No. 12, pp. 2262-2270, Apr. 20, 2010.

Duncan, B.D., et. al., "Stripmap Holographic Aperture Ladar," 21st Annual Meeting of the IEEE Lasers and Electro-Optics Society, LEOS 2008, pp. 511,512, Nov. 9-13, 2008.

Marron, J.C., et. al., "Distributed Aperture Active Imaging," Laser Radar Technology and Applications XII edited by Monte D. Turner and Gary W. Kamerman, Proc. of SPIE, vol. 6550, pp. 65500A-1-65500A-7, 2007.

Christopher Drew, "Drones are weapons of choice in Fighting Qaeda," The New York Times (http://www.nytimes.com/2009/03/17/business/17uav.html?_r=1), Mar. 17, 2009.

Gaskill J.D., "Linear Systems, Fourier Transforms, and Optics", John Wiley & Sons, Inc., New York 1978, pp. 199-202.

Goodman J.W., "Introduction to Fourier Optics", 2nd edition, McGraw-Hill, New York. 1996, pp. 5, 9, 308-309.

Marcel J. E. Golay, "Point Arrays Having Compact, Nonredundant Autocorrelations," J. Opt. Soc. Am. 61, 272-273 1971.

Dillow, New Holographic Device Can Record and Display 3-D Holograms in Near Real Time, posted Nov. 3, 2010, http://www.popsci.com/technology/article/2010-11, pp. 1-6.

Horton, "Air Force backing UA's hologram development", Feb. 9, 2008, http://tucsoncitizen.com/morgue/2008/02/09/76478-air-force-backinq-ua-s-hologram-development.

Zebra Imaging—http://en.wikipedia.org/wiki/Zebra Imaging, pp. 1-3.

Saenz, "3D Hologram Prints Invade Military, Commercial Design", posted Dec. 16, 2010, http://singularityhub.com/2010/12/16/3d-hologram-prints-invade-military-commercial-design, pp. 1-6.

"Overview of Current Methods of 3D Display," obtained from the website http://www.holovision.com.

"HolovisionTM: Three-Dimensional Display Without Special Eyewear," obtained from the website http://www.holovision.com.

Benzie, P., "A Survey of 3DTV Displays: Techniques and Technologies," Circuits and Systems for Video Technology, IEEE Transactions on , vol. 17, No. 11, pp. 1647,1658, Nov. 2007.

"White Paper: Glasses-Free 3D vs 3D Holographic: Provision to the Rescue," obtained from the website http://provision.tv/plugins/tinymce/plugins/filemanager/files/Glasses%20Free%203D%20vs%203D%20Holographic.pdf.

Ozaktas, H.M. and Onural L., "Signals and Communication Technology: Three-Dimensional Television: Ch. 13—Solving the 3D Problem," pp. 471-503, 2007.

Carlos A. Soto, "5 Technologies Changing our World," Washington Technology, Apr. 5, 2011.

David H. Freeman, "Future Tech: Looking Forward to the Post-Screen Era," Mar. 2011 issue of Discover Magazine.

Sarah J. Purewal, "Holographic TV Coming Your Way in 2017," obtained from http://www.techhive.com/article.209772/Holographic_TV_Coming_Your_Way_in_2017.html.

Seung-Cheol Kim, Dong-Choon Hwang, Dong-Hwi Lee, and Eun-Soo Kim, "Computer-generated holograms of a real three-dimensional object based on stereoscopic video images," Appl. Opt. 45, 5669-5676 (2006).

Roggemann, Michael C., et al. Three-Dimensional Imaging and Satellite Attitude Estimation Using Pulse Laser Illumination and a Remote Ultra-Low Light Imaging (RULLI) Sensor for Space Situational Awareness (SSA). Air Force Research Lab, Kihei Maui HI Detachment 15, 2008.

David Abookasis and Joseph Rosen, "Three types of computer-generated hologram synthesized from multiple angular viewpoints of a three-dimensional scene," Appl. Opt. 45, 6533-6538 (2006).

Karaman et al.; "Synthetic Aperture Imaging for Small Scale Systems"; May 1995. IEEE Transactions on Ultrasonics, Ferroelectrics; and Frequency Control: vol. 42, No. 3, pp. 429-442.

Office Action dated Jul. 6, 2015 in U.S. Appl. No. 13/767,775.
Office Action dated May 22, 2015 in U.S. Appl. No. 13/953,371.

\* cited by examiner

SYSTEMS AND METHODOLOGIES RELATED TO FORMATTING DATA FOR 3-D VIEWING

RELATED APPLICATIONS

This application claims the benefit of U.S. Provisional Application No. 61/695,569, filed on Aug. 31, 2012, titled "SYSTEMS AND METHODOLOGIES RELATED TO FORMATTING DATA FOR 3-D VIEWING," which is incorporated by reference herein in its entirety.

U.S. Patent Application No. 61/599,334, filed Feb. 15, 2012, titled "SYSTEMS AND METHODOLOGIES RELATED TO 3-D IMAGING AND VIEWING" is also incorporated herein by reference in its entirety to be considered part of this specification.

BACKGROUND

1. Field

The present disclosure relates to 3-D imaging and viewing, and more particularly, to systems and methods for compressing and/or uncompressing, data used to project images that appear to be three-dimensional (3-D).

2. Description of Related Art

Viewing content that appears to be in three-dimensions is increasingly desirable to consumers and is beneficial for other applications including but not limited to medical, military, and industrial. Accordingly, what is useful are cameras for capturing images and projectors or other systems for projecting images that appear to be in 3-D. Likewise, what is needed are methods for capturing images of an object and producing data for driving these 3-D projectors.

SUMMARY

Various, although not necessarily all, embodiments disclosed herein, include methods and apparatus for processing data for driving 3-D projectors. Such processing may include compressing the data. Similarly, processing may include uncompressing the data. Additionally, image acquisition instruments may be employed to capture images used to produce data for driving the 3-D projectors. The data obtained from the image acquisition instruments may be compressed. Projectors may also be used to form 3-D images of the object based on the compressed data after decompressing the data.

Various, although not necessarily all, embodiments describe herein include a method for formatting data usable for 3-D image formation wherein the method comprises receiving data based on one or more images and performing data compression on the data so as to reduce bits used to represent the data. The data includes information representative of an interference of an optical intensity image of the object and a reference beam. Phase and amplitude information are included in the data or is extractable from the data. The data compression compresses at least one of the phase and amplitude. The phase is compressed in a non-identical manner than said amplitude if both the phase and amplitude are compressed.

Various, although not necessarily all, embodiments disclosed herein, include an apparatus for capturing data usable for 3-D image formation. The apparatus includes an image acquisition component configured to capture one or more images of an object. At least a portion of the one or more images has depth information. The apparatus further comprises one or more processors configured to generate data based on the one or more images. The data includes information representative of an interference of an optical intensity image of the object and a reference beam. Phase and amplitude information is included in the data or is extractable from the data. The processor is further configured to perform data compression on the data so as to reduce bits used to represent the data. The data compression compresses at least one of the phase and amplitude. The phase is compressed in a non-identical manner than the amplitude if both the phase and amplitude are compressed.

Various, although not necessarily all, embodiments disclosed herein, include an apparatus for displaying a 3-D image comprising one or more processors configured to receive data based on one or more images and a display configured to provide a 3-D image based on the uncompressed data. The data includes information representative of an interference of an optical intensity image of the object and a reference beam. The data is compressed so as to reduce bits used to represent the data. The one or more processors is configured to uncompress the data. Phase and amplitude information is included in the uncompressed data or is extractable from the uncompressed data. The data compression compresses at least one of the phase and amplitude. The phase is compressed in a non-identical manner than the amplitude if both the phase and amplitude are compressed.

Various, although not necessarily all, embodiments disclosed herein, include a method for processing complex image data. The method comprises obtaining complex image data having an intensity portion and a phase portion. Each of the intensity portion and the phase portion includes a plurality of color components. The method further comprises compressing the intensity portion to yield a compressed intensity data that includes all of the color components present in the intensity portion and compressing the phase portion to yield a compressed phase data that includes less than all of the color components present in the phase portion.

Various, although not necessarily all, embodiments disclosed herein, include a method for processing complex image data comprising obtaining complex optical image data having an intensity portion and a phase portion and compressing the phase portion to yield a compressed phase data, wherein compressing the phase portion comprises quantizing the phase.

Various, although not necessarily all, embodiments disclosed herein, include a method for processing complex image data comprising obtaining complex optical image data having an intensity portion and a phase portion and compressing the phase portion to yield a compressed phase data, wherein compressing the phase portion comprises averaging the phase in visually flat areas.

BRIEF DESCRIPTION OF THE DRAWINGS

FIG. 6 shows an example of how an image of an object having depth appears upon being imaged by a 2-D sensor array.

FIG. 7 shows how the example object of FIG. 6 appears on the 2-D sensor array when viewed from different perspectives.

DETAILED DESCRIPTION OF SOME EMBODIMENTS

The headings provided herein, if any, are for convenience only and do not necessarily affect the scope or meaning of the claimed invention.

Provided herein are various examples of methodologies and systems for generating data that can be used to provide 3-D imaging for one or more viewers. Also provided herein are various examples of processing this data, which may include compressing the data. Data compression can shorten the time used in transporting data and the amount of data storage used in storing the data. The data can thereafter be uncompressed and employed, for example, to display 3-D images. Other implementations are also possible based on one or more features described herein.

Figure 1:
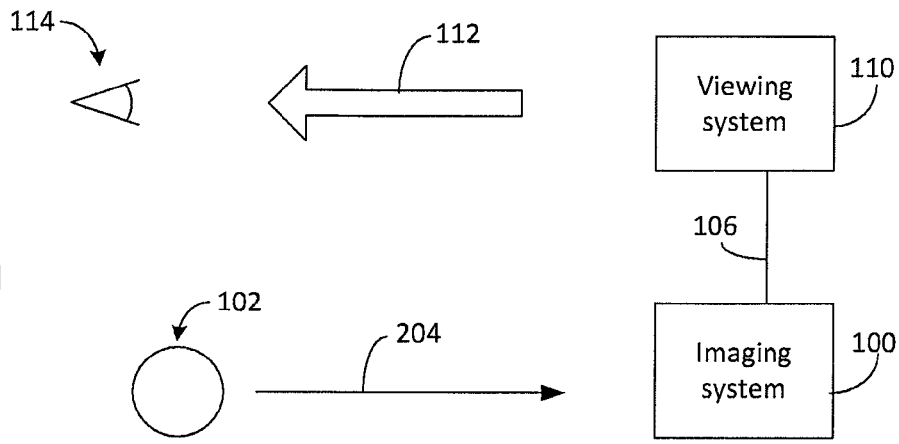
FIG. 1 schematically depicts a system having an imaging component configured to form a complex image of an object and a viewing component configured to allow viewing of a 3-D image of the object based on the complex image.

FIG. 1 schematically depicts an example of a system, where an object 102 is imaged by an imaging system 100 with an optical signal 204 having both intensity and phase information. The imaging system 100 can be configured to form a complex image of the object 102 and to generate data representative of such a complex image. Examples of such a complex image and data are described herein in greater detail.

FIG. 1 further shows that the imaging system 100 can be configured to transfer (line 106) the complex data to a viewing system 110. Non-limiting examples of how such a transfer of data can be implemented are described herein in greater detail. In various examples described herein the data can be compressed to facilitate data transfer. The viewing system 110 is depicted as generating a 3-D representation (112) of the object for viewing by a viewer 114. Examples of how such a 3-D representation can be generated are described herein in greater detail.

Figure 2:
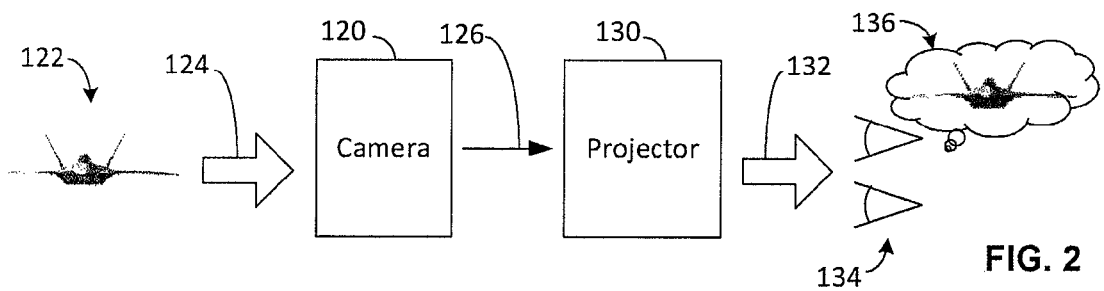
FIG. 2 shows that in some implementations, the imaging component can include a camera, and the viewing component can include a projector.

FIG. 2 shows that in some implementations, the imaging system 100 of FIG. 1 can include a camera 120 having an intensity-based imaging sensor, and the viewing system 110 can include a projector 130. The camera 120 is depicted as forming an image of an object via an optical signal having both intensity and phase information. The camera 120 can then output a signal that can be transferred (arrow 126) to the projector 130. The projector 130 is depicted as generating (arrow 132) a 3-D image 136 of the object 122 for one or more viewers 134.

Figure 3A:
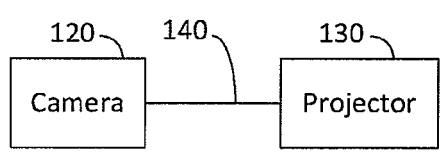
FIGS. 3A-3D schematically depict some non-limiting examples of how information about the complex image can be transferred from the camera to the projector.
Figure 3B:
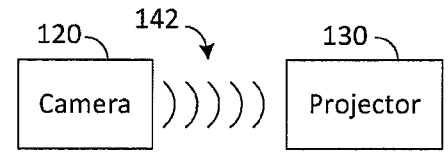

As described herein, a signal transferred between a camera and a projector can be in a number of different forms, and can also be achieved in a number of different manners. By way of non-limiting examples, FIG. 3A shows that in some embodiments, a signal from a camera 120 can be transferred to a projector 130 via a path that includes a wire 140 (transmission line, cable, etc). Such a wire path 140 can allow the camera 120 and the projector 130 to be in close proximity to each other, or separated by a distance. FIG. 3B shows that in some embodiments, a signal from a camera 120 can be transferred to a projector 130 wirelessly (142). In some implementations, transfer of signal between the camera 120 and the projector 130 can include a combination of wire-based and wireless paths. As discussed above, the data may be compressed to facilitate data transfer and/or data storage. Processes for compressing are disclosed herein. The compressed data may be uncompressed and used to display an image for a viewer.

Figure 3C:
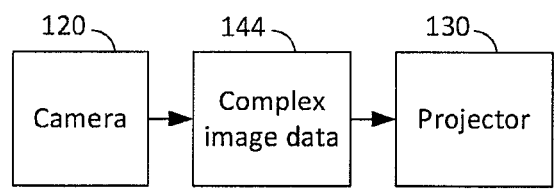

FIG. 3C shows that in some implementations, the foregoing signal generated by the camera 120 can be in a form of formatted complex image data 144. In some embodiments, such data can include digital data representative of a complex image recorded by the camera 120.

Figure 3D:
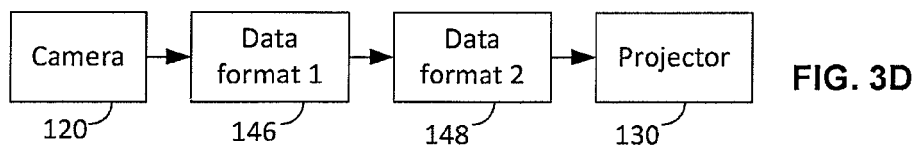

FIG. 3D shows that in some implementations, the foregoing data output by the camera 120 can be converted one or more times before reaching the projector 130. In the example shown, an output of the camera 120 is depicted as being in a first format 146 which is then converted to a second format 148 before being provided to the projector 130. Other configurations can also be implemented.

In some implementations, one or more of the example configurations of FIGS. 3A-3D can include one or more computing devices that facilitate transfer, processing, and/or conversion of signals or data between the camera 120 and the projector 130. For example, the processor may be used to produce the complex image or data representing the complex image based on output of the camera. Examples of how such processors yield complex images and/or data representing the complex image are described herein in greater detail.

Example of Camera that Uses Laser Light

Figure 4:
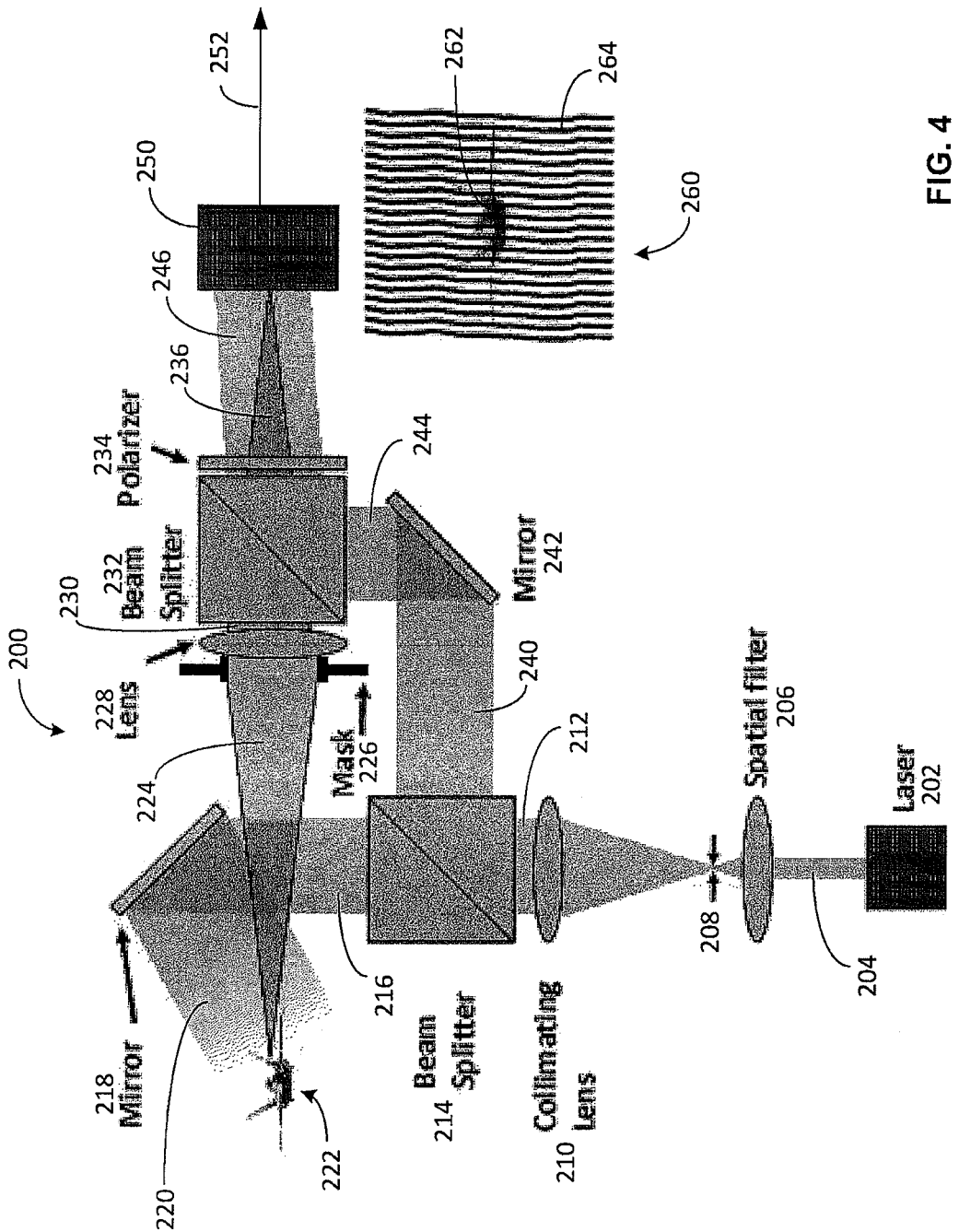
FIG. 4 shows an example camera system that can be configured to generate an output representative of a complex image formed at an intensity imaging sensor. As shown, this camera illuminates the object with laser light.

FIG. 4 shows an example configuration of a camera 200 that uses laser light and that can form an intensity image 260 of an object 222 having complex information encoded in the image. Such an image can be formed at an imaging plane of an intensity-based imaging sensor 250 as follows. A coherent light beam 204 from a source 202 such as a laser is depicted as passing through a spatial filter assembly 206 (e.g., converging lens and an aperture 208) so as to yield a spatially filtered diverging beam. The diverging beam is depicted as passing through a collimating lens 210 so as to yield a broadened collimated beam 212.

The collimated coherent beam 212 can pass through a beam splitter 214 so as to yield a reference beam 240 and an illumination beam 216. The illumination beam 216 can be redirected (e.g., by a mirror 218) into a beam 220 directed at the object.

An example ray tracing resulting from reflection of the illumination beam 220 from a portion of the object 222 is depicted. A ray envelope 224 is depicted as diverging from the object 222. The diverging ray envelope 224 is depicted as being provided to an assembly of imaging optics (e.g., an aperture or mask 226 and an imaging lens 228) so as to yield a converging ray envelope 236 focused at an imaging plane of the imaging sensor 250. The imaging lens 228 images the object onto the imaging sensor 250. In some embodiments, for example, the object and the imaging sensor are at conjugate planes or nearly conjugate planes. This imaging sensor 250 may comprise an array of detectors such as a CCD or CMOS detector array. The aperture 226 can be configured to include a number of shapes (e.g., a rectangular shaped aperture) so as to yield a defined converging ray envelope 236.

The reference beam 240 emerging from the beam splitter 214 can be directed to the beam splitter 232 (e.g., by a mirror 242) as a beam 244. At least a portion of the reference beam 244 can be redirected to the imaging sensor 250 as a reference beam 246 along with the ray envelope 236.

The foregoing example configuration can yield the intensity image 260 that includes phase information 264 encoded on interference fringes that result from interference of an intensity image 262 of the object 222 and the reference beam 240. The intensity distribution of such an interference pattern can be recorded by an intensity-based imaging sensor 250 so as to yield an output signal 252. The phase (complex) information is encoded in the interference fringes. As described herein, the complex data can be un-coded by either physical or digital masking in Fourier space.

Example of Projector for Display 3-D Image

Figure 5:
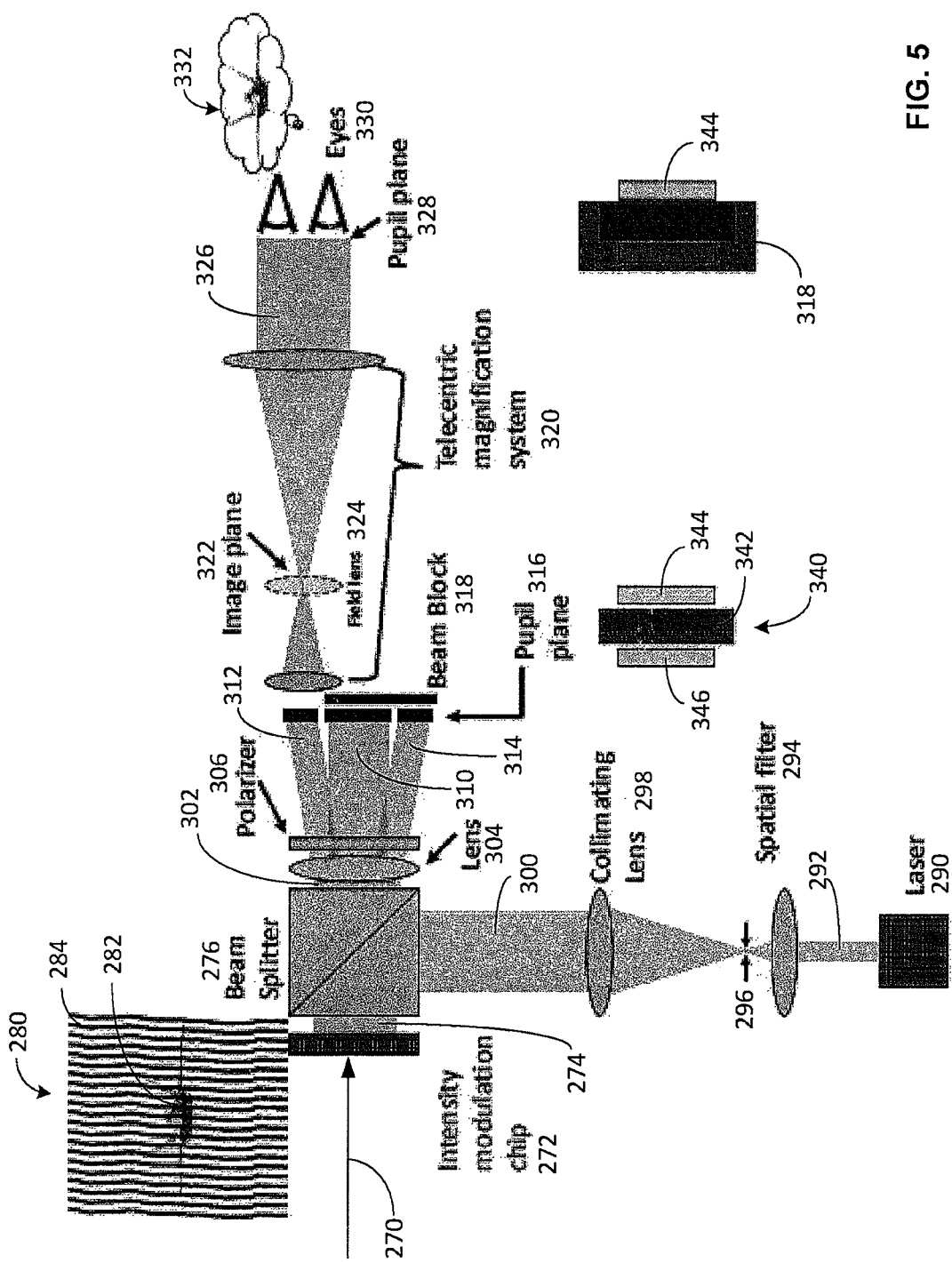
FIG. 5 shows an example projection system that can be configured to receive data representative of the output of the camera system of FIG. 4 and generate a 3-D image for a viewer.

FIG. 5 shows an example configuration of a projector that can project a 3-D image 332 viewable by one or more eyes 330 positioned at or near a pupil plane 328. An input signal 270 is depicted as being provided to an intensity modulation device 272 such as an LCOS, LCD, DLP, or other type of spatial light modulator. The input signal 270 can be a signal received directly from a camera (e.g., a camera 200 of FIG. 4 and the output signal 252 thereof), a signal processed by one or more computing devices, a signal from a media, or some combination thereof. As discussed more fully below, the input signal can be provided by different types of cameras including those that do not used laser light for illumination and those that may use natural or ambient light instead.

In some implementations, an image formed on the intensity modulation device 272 based on the input signal 270 can be substantially the same as a corresponding image formed on the camera's imaging sensor.

An intensity image (e.g., an image 280 that includes phase information 264 encoded in interference fringes 284 that result from interference of the intensity image 262 of the object 222 and the reference beam 246 of the camera 200 shown in FIG. 4) formed on the modulation device 272 can be illuminated by a broadened and collimated laser beam 274 supplied by a laser 290 via a beam splitter 276. As shown, coherent light beam 292 from the laser 290 can be passed through a spatial filter assembly 294 (e.g., converging lens and an aperture 296) so as to yield a spatially filtered diverging beam. The diverging beam is depicted as passing through a collimating lens 298 so as to yield a broadened collimated beam 300 that enters the beam splitter 276 to yield the illumination beam 274. Although the beam 300 is shown as collimated by collimating lens 298, collimation is not necessary.

Reflection of the illumination beam 274 modulated by the modulation device 272 is shown to be directed back through the beam splitter 276 so as to yield a projection beam 302. Although the example configuration of FIG. 5 is in the context of a reflective intensity modulation device, it will be understood that similar projection can also be achieved by an appropriately illuminated transmissive intensity modulation device.

Referring to FIG. 5 and the insets therein, the projection beam 302 can be separated into different spatial components. For example, a central component 342 and side lobes 344, 346 that are the Fourier transform 340 of the interference image 280 are produced by a lens 304. As is well known, a lens can yield the Fourier transform of an object as is the case here. FIG. 5 further shows a polarizer 306 accompanying this lens. The polarizer provides polarization but is not necessary. In some embodiments, for example, other polarization optics and/or a laser that output a polarized laser is used. The polarizer can also be useful to control overall intensity levels. Such a separation can be configured so that the resulting spatial components 310, 312, 314 are sufficiently separated at a pupil plane 316. The components 310, 312, 314 include a central lobe 310 comprising the autocorrelation of the complex pupil information, one side lobe 312 that is the complex pupil information, and the opposite side lobe 314 that is the complex conjugate. Moreover, the lens 302 provides that the Fourier components of the object are at the pupil plane 316. The example separated components 310, 312, 314 correspond to the center lobe 342 and the side lobes 344, 346, respectively.

A beam block 318 is shown to block passage of the separated components corresponding to the center lobe 342 and one side lobe (346) and allowing passage of the separated component corresponding to the other side lobe 344. By isolating one of the side lobes 344, complex information and phase can be extracted therefrom. As described in the herein-referenced U.S. patent application Ser. No. 13/308,110, which is hereby incorporated by reference in its entirety, such a side lobe can include substantially full complex information for a selected spatial frequency range of the object.

In some implementations, a relay assembly 320 or projection optics can be provided so as to direct the passed component 312 to the pupil plane 328. The relay assembly also images the complex pupil plane 312 forming the pupil plane 328 at the conjugate location.

FIG. 5 further shows that in some embodiments, an optional field lens 324 can be provided at an image plane within the magnification/de-magnification system 320. Such a field lens can be configured to place the pupil plane at a selected distance from the last telecentric lens so as to allow, for example, control of eye relief distance and the last lens' size.

As described herein, the projector shown in FIG. 5 can project the image obtained by the camera shown in FIG. 4 and yield a virtual image 332 corresponding to the object 222. In some implementations, the camera 350 and/or the projector 370 can be configured so that the projector's optics yield an exit pupil configuration that substantially mimics the rays entering the camera pupil. Such a configuration can desirably make it seem like the viewer's eye(s) positioned at or near the projector's exit pupil is(are) at or near the camera's pupil location.

Although FIGS. 4 and 5 show example of camera's and projectors that may be used to provide a 3-D image to a viewer, other cameras and other projectors may be used.

Example of Cameras that Use Natural Light to Obtain 3-D Images

As discussed above, the camera shown in FIG. 4 obtains complex image data by illuminating the object with coherent light such as laser light. Various embodiments of camera's described herein do not employ laser light, but instead can use natural light or ambient light. Moreover, incoherent light, such as but not limited to incoherent light produced by incandescent lighting, light emitting diodes, as well as fluorescent lighting may be used.

Figure 6:
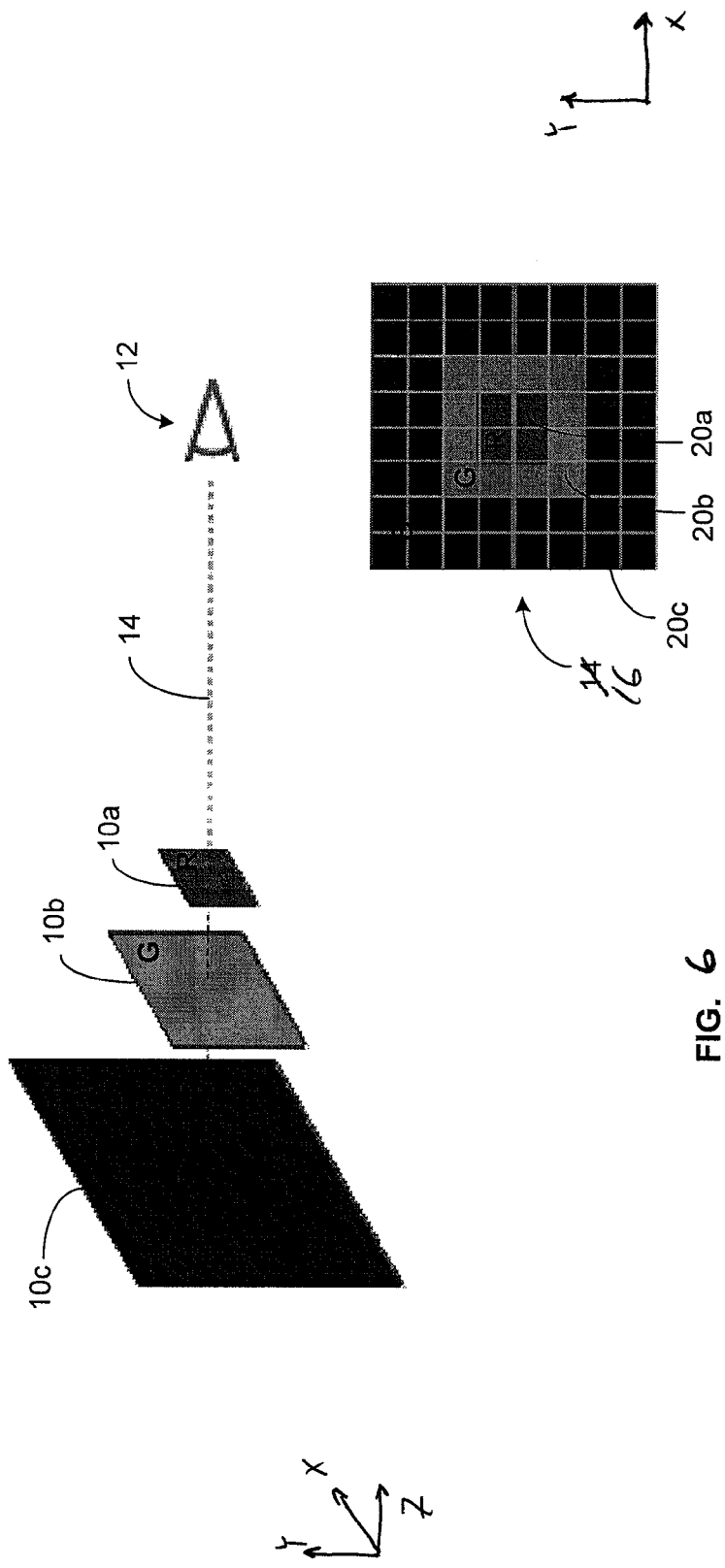
FIGS. 6 and 7 illustrate the basis for a camera that can produce 3-D information about an object without using laser light and using natural light instead.
Figure 7:
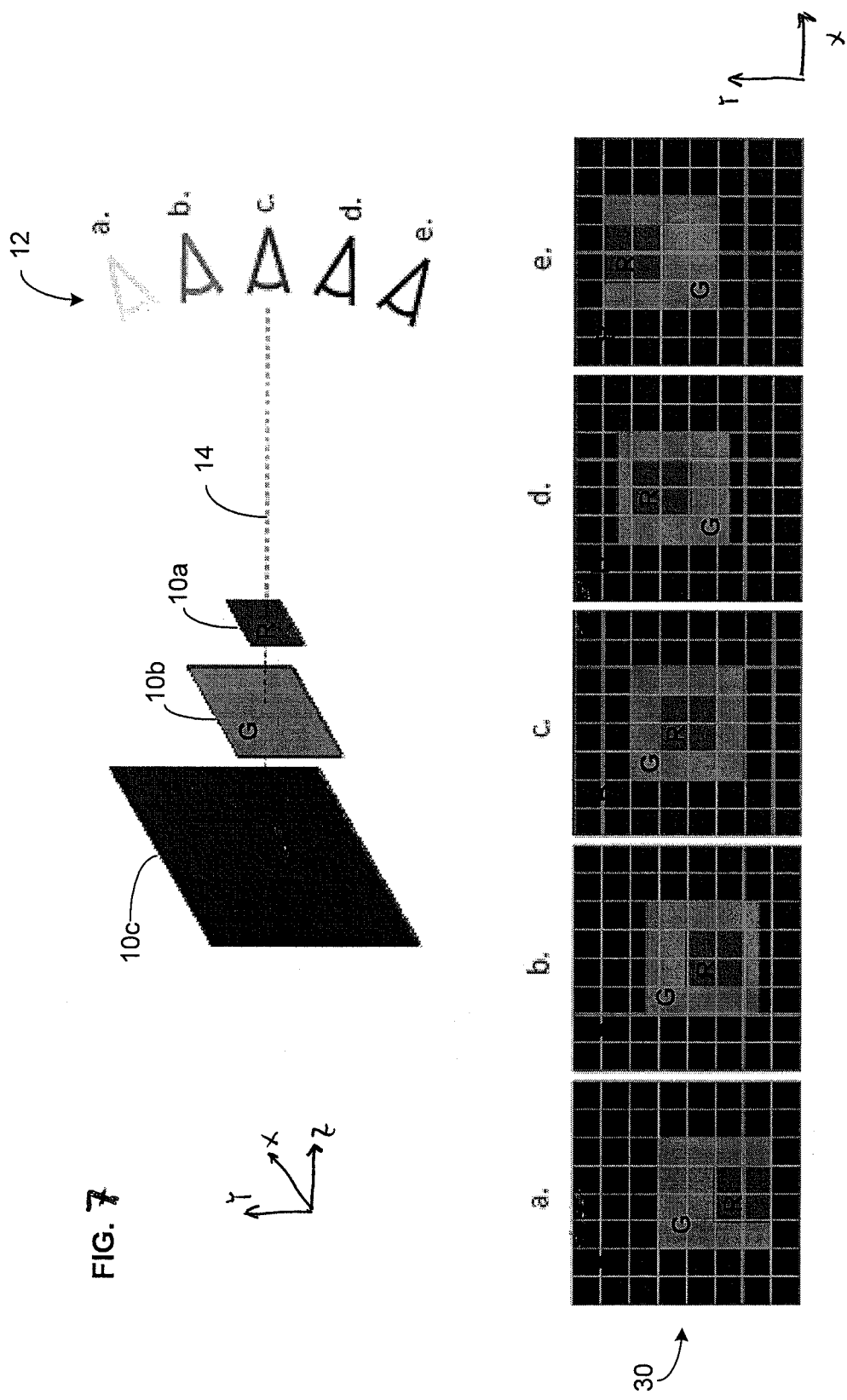

FIGS. 6 and 7 illustrate the basis for a camera that can produce 3-D information about an object without using laser light and using natural light instead. FIG. 6 shows an example of how an image of an object having depth appears upon being imaged by a 2-D sensor array. FIG. 7 shows how that 2-D image changes when viewed the perspective (i.e. location and orientation) of the 2-D sensor array changes.

FIG. 6 schematically shows a viewing situation where a viewer or camera 12 is viewing an object 10 having depth and color. In this example, the camera can be a single non-holographic cameras that captures 2-D images using natural light. As shown in FIG. 6, the illustrated object 10 shown in an x, y, z coordinate system, has a red (R) portion 10a that is closest to the viewer 12, a green (G) portion 10b that farther away, and a blue (B) portion 10c that is the farthest. When viewed at a given viewing orientation 14, an image 16 can be perceived by the viewer 12. Such an image will be perceived as being generally flattened (e.g., only shown in an x-y plane) such that different depths of the different portions of the object 10 are not discernable. For example, images 20a, 20b, 20c corresponding to object portions 10a, 10b, 10c appear to be flattened into a common depth. The 16 image is two-dimensional and not 3-D.

FIG. 7 schematically shows that when the 3-D object 10 of FIG. 6 is viewed from different perspectives. As shown, the viewer 12 is at different locations and views are from different orientations. As discussed above, the viewer may be a camera such as a non-holographic natural lit camera that captures 2-D images. In the example shown in FIG. 7, to provide images from different vantage points, the viewer 12 may correspond to a multi-view camera system such as a plenoptic camera, an array of plenoptic cameras, an array of cameras, a single moving camera, an array of moving camera's etc, each of which captures 2-D images and can operate based using natural light. As illustrated, the resulting 2-D images 30 are different even though the images 30 are flattened or two-dimensional (rendered in an x-y plane). For example, a view from position "a" can yield an image 30a, a view from position "b" can yield an image 30b, and so on. As shown, positions of red and green portions relative to the blue portion change as the viewing position changes. Generally a closer object (e.g., red object 10a) shifts more than a farther object (e.g., green object 10b) during such a change in viewing positions.

Such an effect allows a person to perceive depth by viewing with two eyes, each providing a different perspective, or by shifting viewing positions to provide different vantage points. Such an effect also allows formation of images having depth information using 2-D natural lit cameras.

Figure 8:
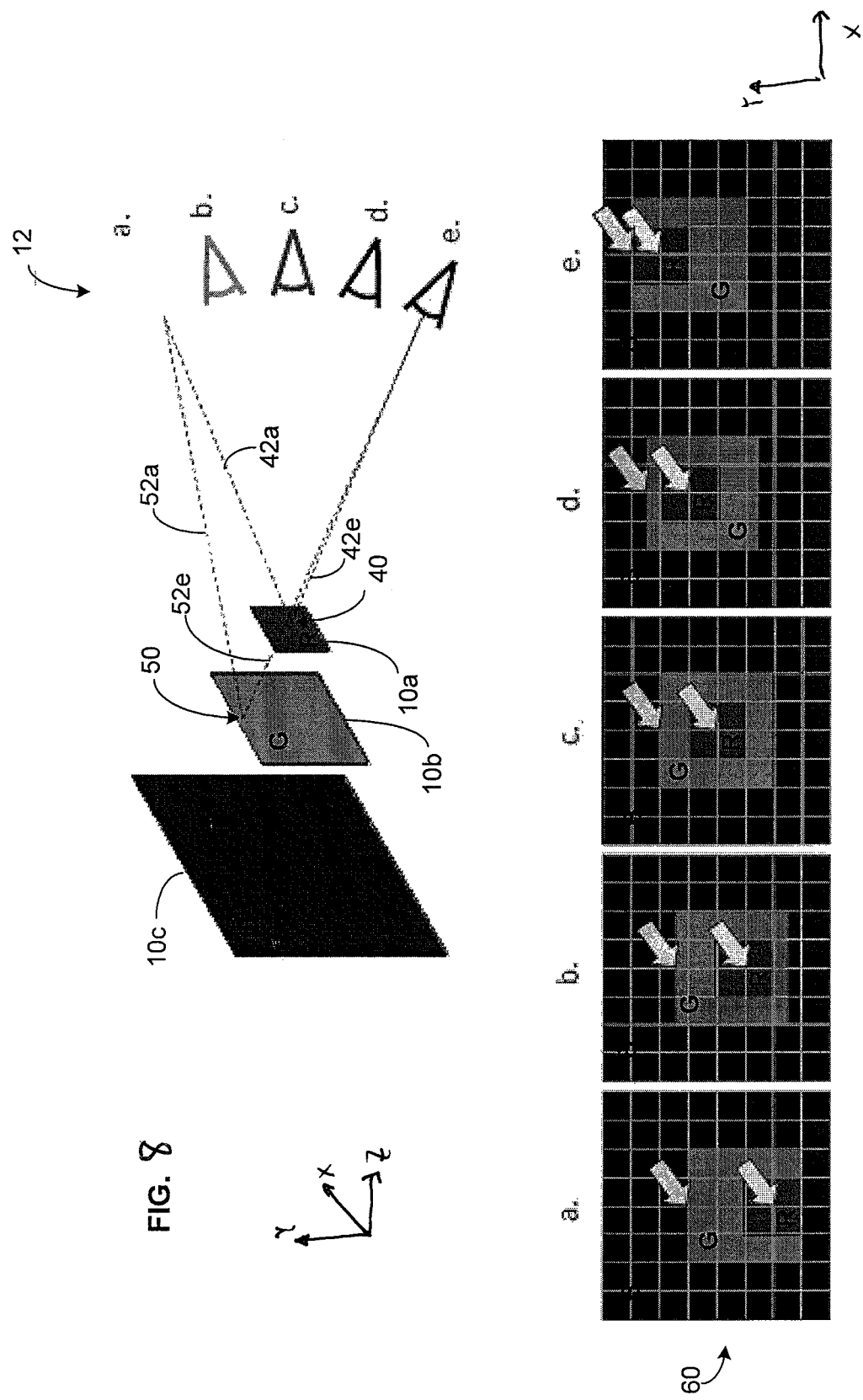
FIG. 8 shows an example of how depth information can be obtained from 2-D images captured from different perspectives.

FIG. 8 shows an example of how such depth information can be obtained. A first point 40 on the red portion 10a is depicted as being viewed from positions "a" and "e" (indicated by dashed lines 42a, 42e). Similarly, a second point 50 on the green portion 10b is depicted as being viewed from the same positions "a" and "e" (indicated by dashed lines 52a, 52e). On corresponding 2-D images 60, the arrows on images 60a and 60e indicate positions of the example points 40 and 50. Positions of the same points 40 and 50 corresponding to viewing orientations "b" to "d" are also indicated by similar arrows. Such differences in relative positions of the points on different portions of the object 10 can provide depth information or perception associated with the points. Accordingly, depths associated with the example red, green and blue portions 10a, 10b, 10c can be perceived by a viewer.

Likewise the unique movement of the feature of images in 2-D (x-y) captured by a plurality of cameras at different vantage yields depth (z) information. Depth information for the same can be obtained and utilized for 3-D viewing. A stereoscopic imaging and viewing is an example of such a 3-D implementation.

Figure 9:
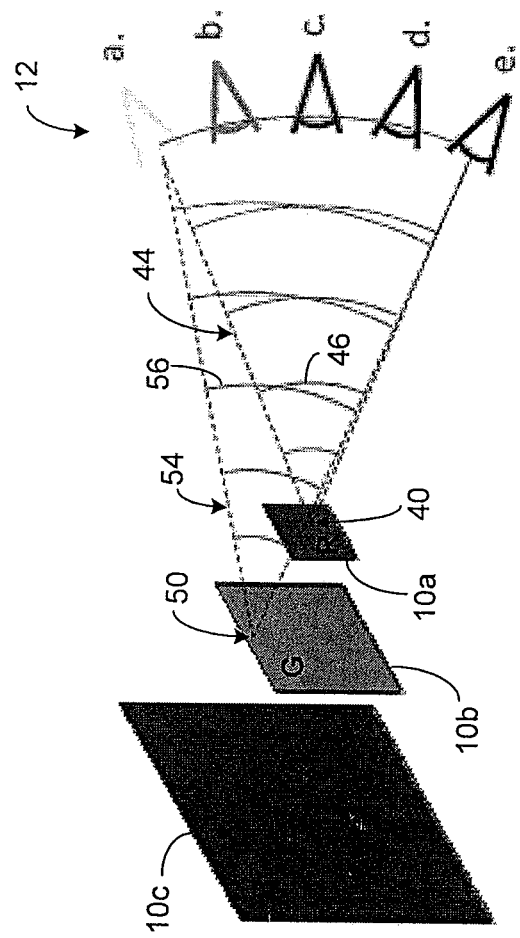
FIG. 9 illustrates how once depth information is acquired such as in the example of FIG. 8, wavefronts can be determined.

Having obtained the depth information, z, and the x, y, z location of each of the points on object imaged in 2-D, for example, using a technique such as shown in FIG. 8, wavefronts of light reflected from the different x, y, z locations on the object can be determined. Simulations of how these wavefronts emanate from the different locations and are combined or interfered with a reference wavefront at the pupil plane may be performed to computer generate a pupil-plane hologram. FIG. 9 schematically illustrates wavefronts emanating from different locations in x, y, z space on the object and being combined at the pupil. In particular, reflected light from example points 40 and 50 are wavefronts 46 (from the red portion 10a) and 56 (from the green portion 10b). Dashed lines 44 and 54 are for illustrative purpose to indicate acceptance ranges of the pupil. In such a representation, a sum of wavefronts at the pupil plane, from different portions of the object, can include depth information for the object.

Figure 10:
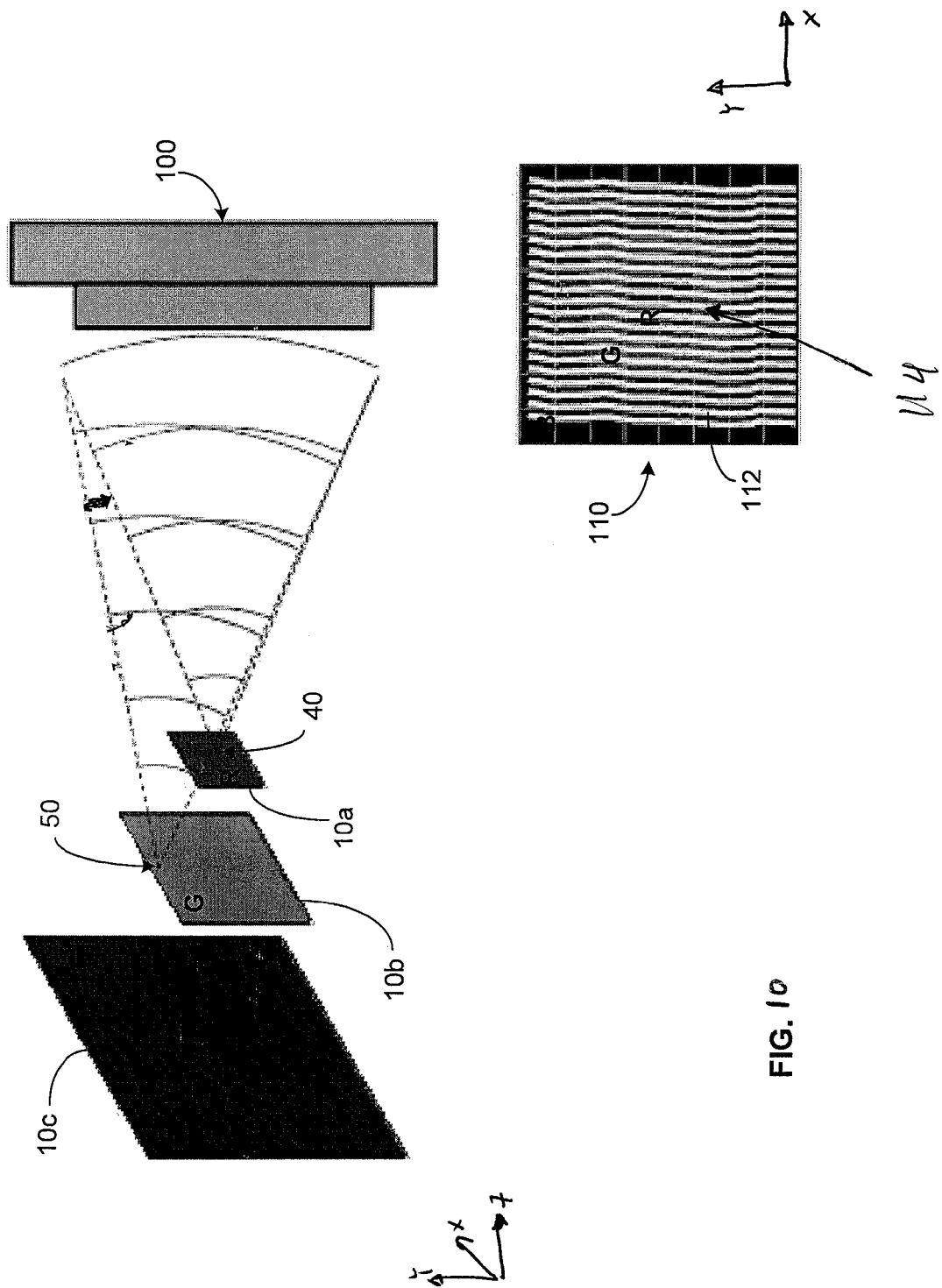
FIG. 10 shows an example of how an image plane hologram can be produced such that a complex image having the desired spatial frequency information is obtained.

From the pupil-plane hologram, an image plane hologram may be calculated. (Although the pupil plane hologram is used to produce the image plane hologram in this example, the pupil plane hologram is not necessary to produce the image plane hologram. The complex description of the object can be used to produce either the pupil plane hologram or the image plane hologram). The complex image at the image plane is the combination or summation of the wavefronts from the object at the image plane. The image plane hologram is the combination or summation of the wavefronts from the object at the image plane. As described above, with the depth information, the x, y, z, coordinates of the surface of the object are know and from those locations wavefronts may be propagated as if light was reflected therefrom. The image plane hologram includes the coherent summation and interference of these wavefronts with each other as well as the effects of interference with a reference wavefront. A computer generated image-plane hologram can thus be produced by knowing the object features and simulating wavefronts propagating therefrom and interfering with each other and a reference wavefront. The resultant data, a hologram, appears as though created by a holographic camera, which is illustrated in FIG. 10. FIG. 10 shows an imaging system 100 such as a holographic camera configured to form a complex image 110 (inset in FIG. 10) having both intensity and depth information. The depth information is incorporated in the fringe pattern, which is depicted as lines 112 of the hologram. In the example described with reference to FIGS. 6-9, similar holographic data, and a similar image plane hologram as shown in the inset in FIG. 10, can be realized using natural light cameras. In either case, depth information can be included in the form of fringes 112. In the case where the holographic data is obtained at the image plane, e.g., for an image plane hologram, the interference fringes 112, which provide phase information, will be accompanied with an intensity image 114 of the object.

A complex image obtained in the foregoing manner can provide a number of advantages when projected for 3-D viewing. Additional details concerning such 3-D projection can be found in the herein-referenced U.S. Provisional Application 61/599,334, which is incorporated by reference in its entirety.

In some implementations, the present disclosure relates to systems and methodologies for generating a selected complex image or related data from images or related data having 3-D information. By way of an example, 3-D information (e.g., depth information) can be obtained from the plurality of intensity images shown and discussed in connection with FIGS. 8-10. Such intensity images can be processed to yield desired 3-D information, and such 3-D information can be incorporated with a representative intensity image to yield a complex or complex-like image or hologram, which may include interference fringes and an intensity image of the object.

Figure 11:
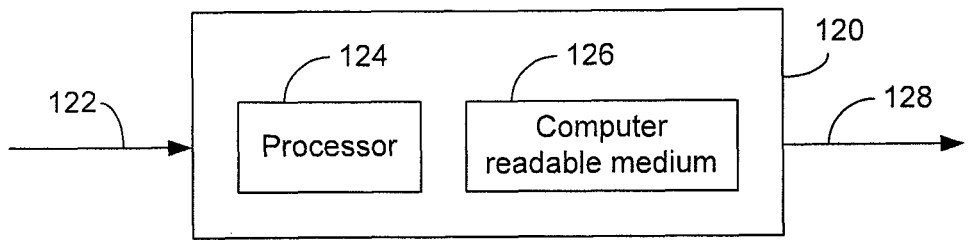
FIG. 11 schematically shows a system that can be configured to generate data representative of a complex image for use in displaying 3-D images.

FIG. 11 schematically shows a system 120 that can be configured to generate the foregoing complex or complex-like image. The system 120 can receive as an input 122 images or image-related data having at least some 3-D information. For example, the images may be 2-D images obtained from different perspectives as illustrated in FIG. 8. The system 120 can generate as an output 128 complex or complex-like images or related data. The output 128 may be an image plane hologram such as shown in the inset of FIG. 10 or data extracted therefrom. Other examples of such inputs and outputs are possible.

FIG. 11 further shows that a processor 124 can be provided to facilitate the foregoing generation of the output 128. In some implementations, a computer readable medium 126 to provide functionalities such as storing input, output and any related data, and/or for storing computer executable instructions for performing one or more processes by the system 120.

Figure 12:
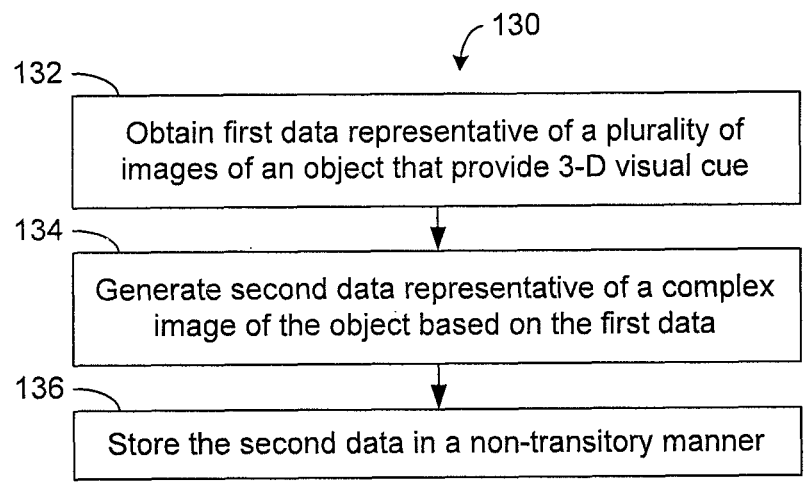
FIG. 12 shows a process that can be implemented to generate data representative of a complex image based on input data representative of multiple 2-D images that provide 3-D visual cues.

FIG. 12 shows a process 130 that can be implemented by the system 120. In block 132, first data representative of a plurality of images can be obtained. Such images can include 3-D information or information that provides one or more 3-D visual cues associated with an object being imaged. In block 134, second data representative of a complex image or complex-like image of the object can be generated based on the first data. In block 136, the second data can be stored in a non-transitory manner.

Figure 13:
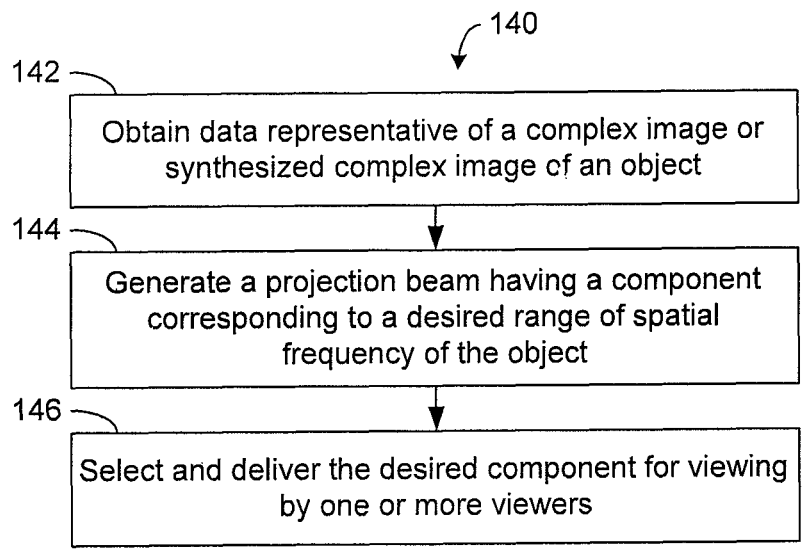
FIG. 13 shows a process that can be implemented to generate a projection based on the data of FIG. 12 so as to yield a 3-D image viewable by one or more viewers. The projector shown in FIG. 5 is an example configuration of a projection system that can perform the projection process of FIG. 13.

As described herein, the second data generated by the example process 130 of FIG. 12 can be configured to be projectable to one or more viewers. In such a context, FIG. 13 shows a process 140 that can be implemented to perform such a 3-projection. In block 142, data (e.g., second data of FIG. 12) representative of a complex or synthesized complex image of an object can be obtained. In block 144, a projection beam having a component corresponding to a desired range of spatial frequency of the object can be generated based on the obtained data. In block 146, the desired component can be selected and delivered for 3-D viewing by one or more viewers.

A 3-D projector such as shown in FIG. 5 can be used is various embodiments. Additional information concerning such an example projection system can be found in the herein-referenced U.S. Provisional Application 61/599,334, which is incorporated by reference in its entirety.

The output 128 of the system 120 (FIG. 11), which can include the second data of FIG. 12 and the projection data of FIG. 13 and can be used by the projector shown in FIG. 5, can be generated in a number of ways. For the purpose of description herein, such an output will be referred to as synthesized complex data. It will be understood that such synthesized data can include 3-D related information that substantially replicates a fully complex image, or provides sufficient 3-D visual cues upon projection.

In the context of the example images providing depth information as described in reference to FIG. 8, such synthesized data can be obtained as follows. A plurality of intensity images (e.g., images 70 in FIG. 12) obtained at different orientations relative to an object can be processed so as to estimate depths of pixels relative to some reference image. For example, suppose that image 70c is selected as a reference image. Then, different features associated with different portions of the image can be provided by, for example, a pattern recognition algorithm. Accordingly, pixels in a given image can be assigned to such different features. Relative displacements of such pixels in one or more images compared to the reference image can yield depth estimates for the pixels, thereby providing depth information as viewed from the reference image perspective.

The foregoing analysis can be repeated based on different reference images to provide depth cues from different perspectives. Further, data corresponding to different perspectives can be combined to yield data that better replicates a complex image resulting from a sum of wavefronts (e.g., from different locations on the object) at the imaging plane. Data having some or all of the depth information can be converted to a format similar to the interference data described in reference to the inset of FIG. 10.

Examples of Other Camera Systems

Figure 14:
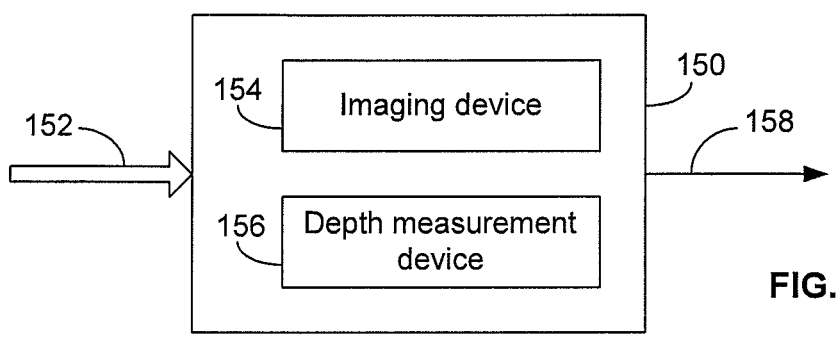
FIG. 14 schematically illustrates a system that can be configured to obtain images and depth information to generate data representative of a complex image for use in displaying 3-D images.

In the foregoing synthesizing example, depth information can be obtained by processing of a plurality of intensity images based on one or more stereoscopic principles. Although the foregoing example of synthesizing complex images can be applied to images obtained via techniques such as stereoscopy other methodologies can be utilized to obtain depth information. For example, FIG. 14 shows that in some implementations, an imaging system 150 can include an imaging device 154 and a depth measurement device 156. The imaging device 154 (e.g., a color camera) and the depth measurement device 156 (e.g., rangefinder) may have their own optics, or they may utilize at least some common optics for imaging and rangefinding (collectively depicted as arrow 152). Data corresponding to the resulting image and the corresponding depths can be generated as an output 158.

In some implementations, such image and depth data can be further synthesized so as to convert the image and depth data to a format similar to the interference data as described herein (e.g., see inset in FIG. 10).

In the two previous examples, synthesizing process can include separate steps of (1) obtaining depth information, and (2) converting the intensity image and depth information into interference data. Other configurations can also be utilized.

Figure 15:
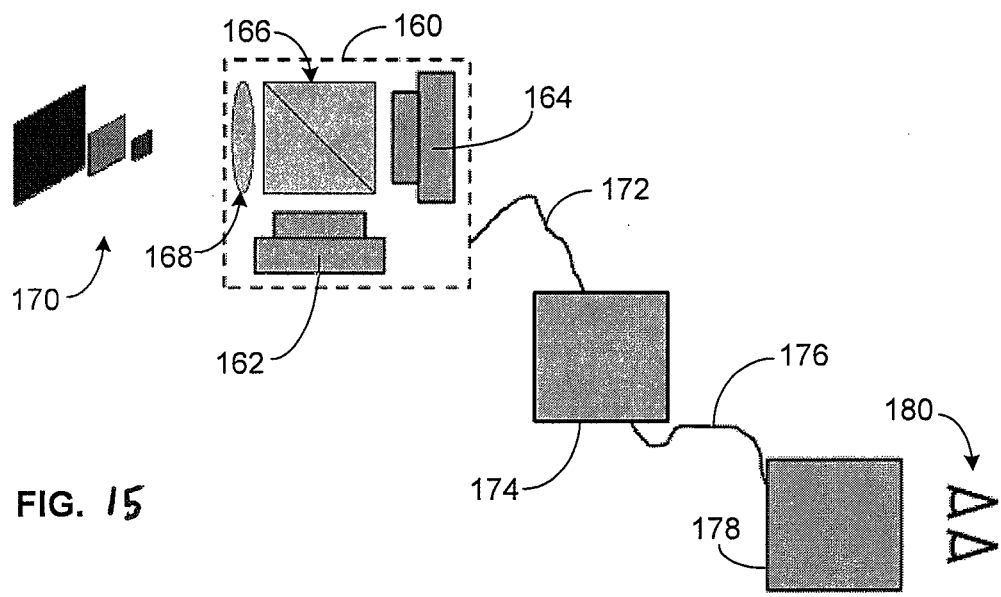
FIG. 15 shows an example of the system of FIG. 14.

FIG. 15 shows that in some implementations, an imaging system 160 can include a first imaging device 162 (e.g., a color camera) and a second measurement device 164 configured to, for example, obtain depth information or an interference image directly. An example of a depth-information obtaining imaging device can include a remote ultra-low light imaging (RULLI) or RULLI-like device. Additional details concerning obtaining of interference images by the second measurement device 164 can be found in the herein-referenced U.S. Provisional Application 61/599,334, which is incorporated by reference in its entirety.

In FIG. 15, an optics assembly 168 is shown to form an intensity image of an object 170, and such an intensity image can be split and formed at the first imaging device 162 and second measurement device 164 by a beam splitter 166. In some implementations, the first imaging device 162 can generate a color intensity image based on reflection of natural light. The first imaging device 162 may, for example, comprise a three color camera. The second measurement device 164 can illuminate the object with an illumination beam so as to yield an intensity image based on reflection of the illumination beam. In some embodiments this illumination beam may be infrared and may be invisible. In the context of the example RULLI or RULLI-like imager, such an illumination beam can be a pulsed laser beam so as to allow detection of different arrival times of the reflected photons to thereby provide depth information. In the context of the interference-generating imager, the second measurement device 164 can include a reference beam that interferes with the intensity image to generate an interference pattern at an imaging plane of the device 164. Other devices and systems may be used as the second measurement device 164 including but not limited to range finders, LIDAR (Light Detection And Ranging) such as flash LIDAR, and time-of-flight measurement systems. As described above, in some embodiments, infrared and invisible light may be used, for example, by the rangefinder, RULLI or RULLI-like system, etc., for obtaining depth information.

In some implementations, signals (172) from the first imaging device 162 and second measurement device 164 can be processed by a synthesizing component 174 so as to yield synthesized data 176 that can be projected by a projector 178 for 3-D viewing by one or more viewers 180. In a configuration where the first imaging device 162 and second measurement device 164 have similar pixel arrays, the synthesizing component 174 can be configured to incorporate the intensity information from the first imaging device 162 and the additional information from the second measurement device 164 pixel by pixel so as to generate the synthesized data. In the context of the example RULLI or RULLI-like device being the second measurement device, arrival times associated with the hit pixels can be converted to depth information for those pixels and attached to color intensities associated with the corresponding pixels of the first imaging device. In the context of the example interference generating device being the second measurement device, intensity values from the second measurement device's pixels can be attached to color intensities associated with the corresponding pixels of the first imaging device. Such combined data can be formatted appropriately so as to yield a format suitable for projection by the projector 178.

In some situations, the pixel arrays of the first imaging device 162 and second measurement device 164 may be different, or there may be some systematic offset in the data obtained therefrom. In such situations, the synthesizing component 174 can be configured to perform appropriate corrections prior to the foregoing incorporation of information. For example, if one device has a smaller pixel count than the other device, a group of pixels in the latter device may be assigned to each pixel of the former device. Other known techniques for matching data or images from the first imaging device 162 and second measurement device 164 can also be utilized.

As discussed above, in some implementations, any illumination beam and/or reference beam utilized by the second measurement device 164 can be configured so as to not degrade the quality of images obtained by the first imaging device 162. As an example, in the context of color images obtained by the first imaging device 162, the second measurement device 164 can be configured to operate with an infrared laser having a wavelength that provides little or no impact on the visual portion of the color image.

Formatting Data

In various embodiments the data generated by the camera, which may comprise complex images or data representative of complex images, is transferred from one device to another device or to a storage medium. The data may for example be transferred from a camera to a projector for viewing. The data may also be transferred from the camera to a storage medium and/or the data may be transferred from a storage medium to a projector. The data may also be transferred to and from a processing device for processing the data.

In various embodiments, compressing the data prior to transfer may be advantageous, for example, by reducing the demands on the data transfer system (e.g. wire based communication systems, wireless communication systems, fiber optic communication systems, and combinations thereof). Similarly, in various embodiments, compressing the data prior to storage may be advantageous, for example, by reducing the demands for storage space. Accordingly, various embodiments described herein involve the formatting of the data such as compressing the data or un-compressing the data.

Figure 16:
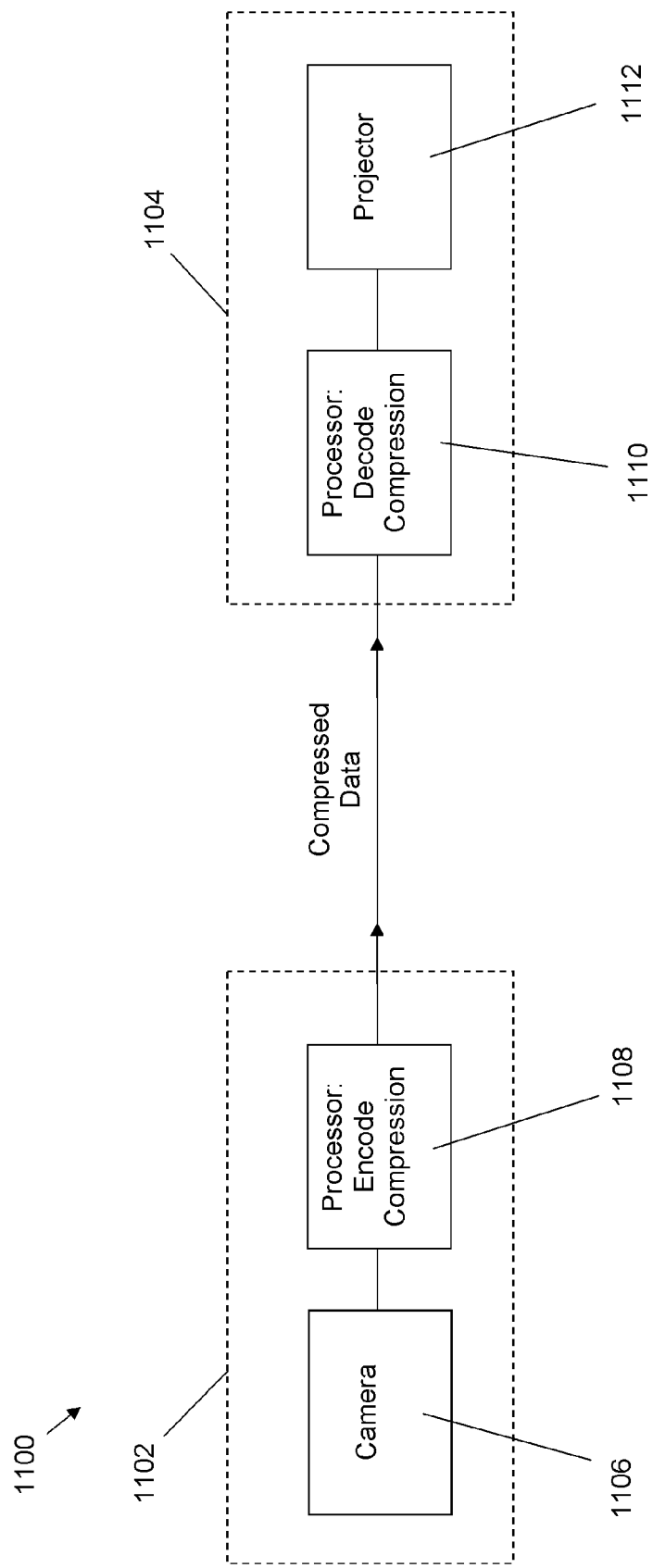
FIG. 16 schematically illustrates the transfer of compressed data from the camera to the projector.

FIG. 16 shows a block diagram of a system 1100 including an apparatus for capturing data 1102 usable for 3-D image formation and an apparatus for displaying a 3-D image 1104. The apparatus for capturing data 1102 compresses the data for storage and/or transport. For example, the compressed data is shown in FIG. 16 as being communicated to the apparatus for displaying a 3-D image 1104.

The apparatus for capturing data 1102 comprises an image acquisition component 1106. The image acquisition component 1106 may comprise an optical sensor to capture one or more images of the object. In some embodiments, the image acquisition component 1106 comprises an interferometer having an optical sensor that captures an interferometric fringe pattern from the object such as the fringe pattern 260 shown in the inset of FIG. 4.

The apparatus for capturing data 1102 may further comprise one or more processors 1108 configured to generate data based on the one or more captured images. This data may include information representative of an interference of an optical intensity image of the object and a reference beam. Phase and amplitude information may be included in this data or is extractable from this data. The one or more processors 1108 may also be configured to perform data compression on the data so as to reduce the number of bits used to represent the data.

In various embodiments, the image acquisition component 1106 is similar to that shown in FIG. 4 and is configured to optically interfere an optical intensity distribution from the object with a reference optical beam to obtain an interference pattern. Moreover, in certain embodiments, the image acquisition component 1106 is configured to interfere an optical intensity image of the object obtained through an imaging pupil and a reference optical beam. Accordingly, the data may comprise an image including a fringe pattern. Such a fringe pattern includes phase information that can be extracted therefrom and that can provide depth information.

The image acquisition component 1106 can also be configured to obtain at least one of the images using a method other than employing optical interference of an intensity image of the object and a reference beam. Examples of such non-interferometric methods are shown in FIGS. 11-15. In such embodiments, for example, the image acquisition component 1106 may comprise one or more devices selected from the group consisting of a camera, a range finder, a time-of-flight measurement device, LIDAR, and a RULLI or RULLI-like device. Such devices may provide depth information useful for 3-D image formation.

As discussed above, for example, with reference to FIG. 4 and FIGS. 11-15, the data obtained by the image acquisition component 1106 may include information representative of an interference of an optical intensity image of the object and a reference optical beam. This data may comprise phase and amplitude. This data may be compressed for transport, for example, to the apparatus configured to display a 3-D image 1104.

The transfer of the data may be accomplished by a wide range of communication techniques including those well known in the art as well as those yet to be devised. Data transmission may, for example, be wireless or over wire or a fiber optic communication system or any combination thereof. Accordingly, data transmission may be via radio waves, light, and/or electrical signals. Data may be processed to facilitate transmission, e.g., compression encoding and decoding, however, other processes may also be used, for example, in transmission, transport, and reception of data.

Accordingly, the apparatus for displaying a 3-D image 1104 may be located at a remote location with respect to the apparatus for capturing data 1102. In fact, portions of the apparatus for displaying a 3-D image 1104 and the apparatus for capturing data 1102 may be located at remote locations with respect to each other. For example, the image acquisition component 1106 may comprise multiple separately located devices. The one or more processors 1108 in the apparatus for capturing data 1102 may also be located remotely from each other or from the image acquisition component 1106. Processing may for example be performed using devices in a network.

As shown in FIG. 16, the apparatus for displaying a 3-D image 1104 comprises one or more processors 1110 configured to receive data based on the one or more images. As stated above, the data may be compressed so as to reduce bits used to represent the data. Accordingly, the one or more processors 1110 may be configured to uncompress the data. In some embodiments, processing may be performed using devices in a network.

The apparatus for displaying a 3-D image 1104 may additionally comprise a display 1112 configured to provide a 3-D image based on the uncompressed data. The display 1112 may comprise a projector or other display device. The display 1112 may comprise, for example, a projector such as shown in FIG. 5. In some embodiments, the display 1112 comprises a spatial light modulator configured to produce an intensity pattern based on the uncompressed data. The intensity pattern may, for example, comprise a fringe pattern such as shown in the inset in FIG. 5. In other embodiments, the display 1112 comprises a phase spatial light modulator configured to selectively modulate phase based on phase information obtained from the uncompressed data.

The spatial light modulator may comprise a liquid crystal display (LCD), liquid crystal on silicon (LCOS), or digital light processing (DLP) in some embodiments. Other types of spatial light modulators may be employed.

Figure 17:
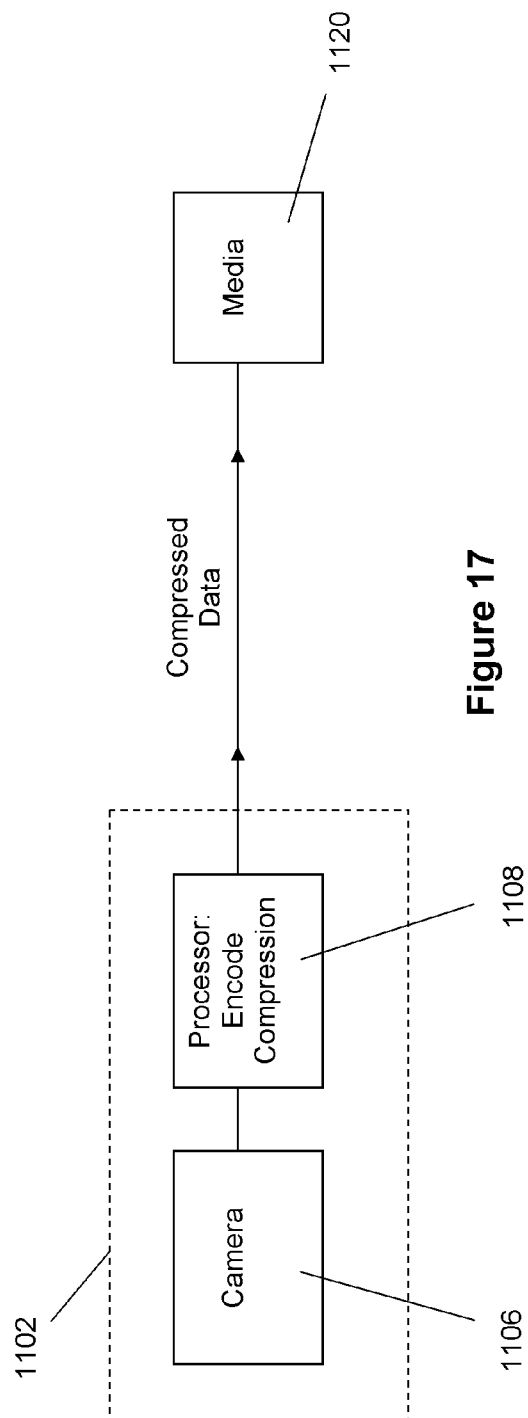
FIG. 17 schematically illustrates a camera system that compresses data transferred to a storage medium.
Figure 18:
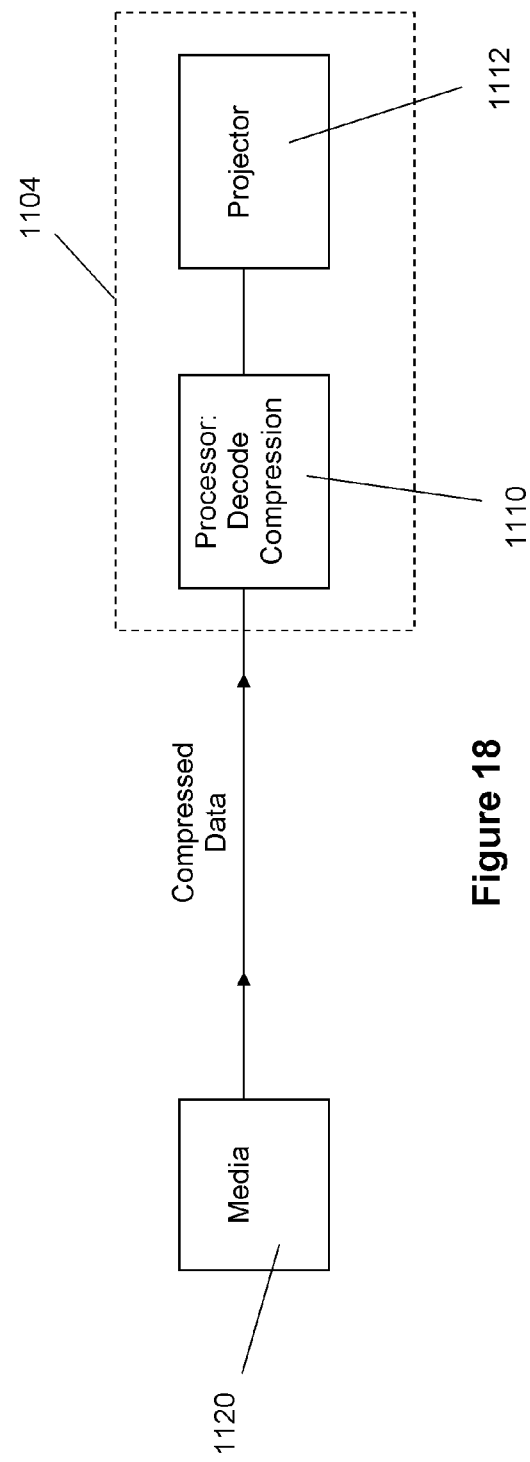
FIG. 18 schematically illustrates a display device that decodes compressed data from a storage medium to provide a 3-D image for viewing.

As illustrated in FIG. 17 the apparatus for capturing data 1102 may output the data to a storage medium 1120. Similarly, the apparatus for displaying 3-D images 1104 may obtain image data from the storage medium 1120 as shown in FIG. 18. As discussed above, images obtained by the image acquisition component 1106 may be compressed by one or more processors such as the processor 1108 in the apparatus for capturing data 1102. In various embodiments, this compressed data may be stored on the storage medium 1120. Likewise, the compressed data on this storage medium 1120 may be uncompressed by one or more processors such as the processor 1110 in the apparatus for displaying a 3-D image 1104. The same storage medium 1120 may be used to receive the data from the apparatus for capturing data 1102 and for providing the data to the apparatus for displaying 3-D images 1104. Alternatively, multiple storage media may be used and the information may be transferred from one storage medium to another, electronically, optically, or otherwise. As discussed above, wireless, wired, and/or optical systems may be utilized to transfer data.

Data compression may facilitate efficient data transfer. The data that may be compressed may comprise amplitude and phase. The data that may be compressed may comprise data representative of amplitude and phase such as the intensity values corresponding to a fringe pattern. The data may also be modified versions of the foregoing examples of data. For example, the data that is compressed may be derived from the amplitude and phase or from intensity values corresponding to the fringe pattern. Other data or types of data may also be compressed.

Figures 19, 20:
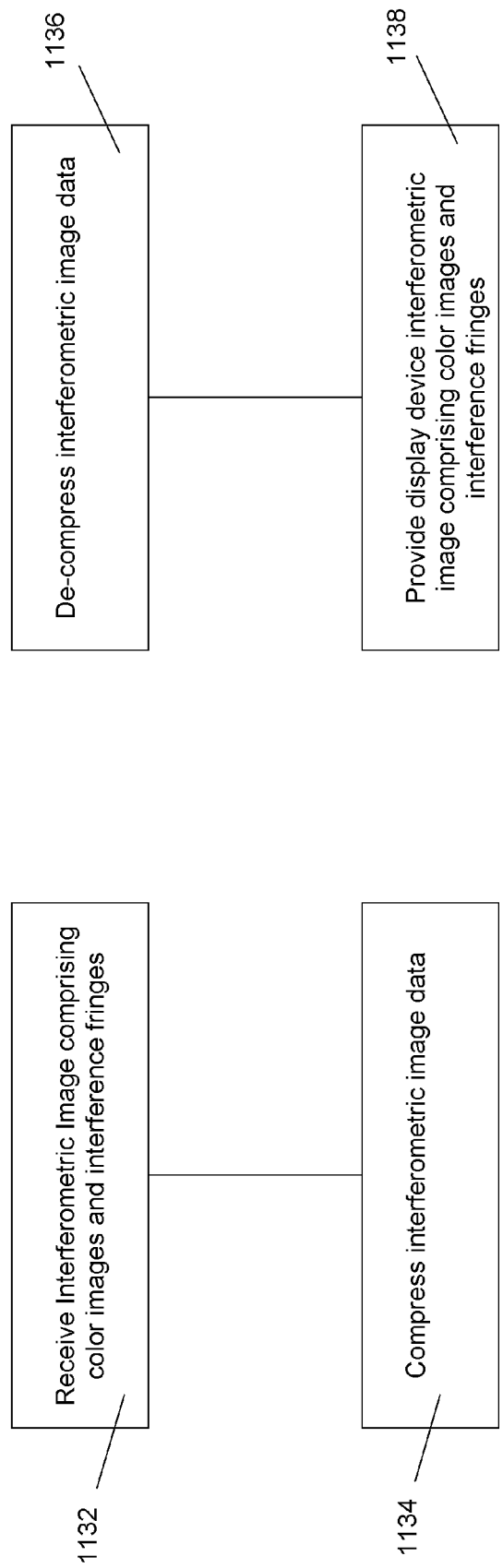
FIG. 19 schematically illustrates a process of formatting complex image data to compress the data.
FIG. 20 schematically illustrates a process of re-formatting compressed complex image data so as to un-compress the data.

FIGS. 19 and 20 are flow diagrams involving processes that may be applicable to 3-D image production based on interferometric image data. In particular, block 1132 in FIG. 19 shows the receipt of interferometric images comprising color images and interference fringes. These interferometric images may be generated by a camera such shown in FIG. 4. This interferometric image data is compressed in block 1134. In block 1136 in FIG. 20, the compressed interferometric image data is decompressed. In block 1138, this decompressed interferometric image is provided, for example, to a display device such as shown in FIG. 5.

Figure 21:
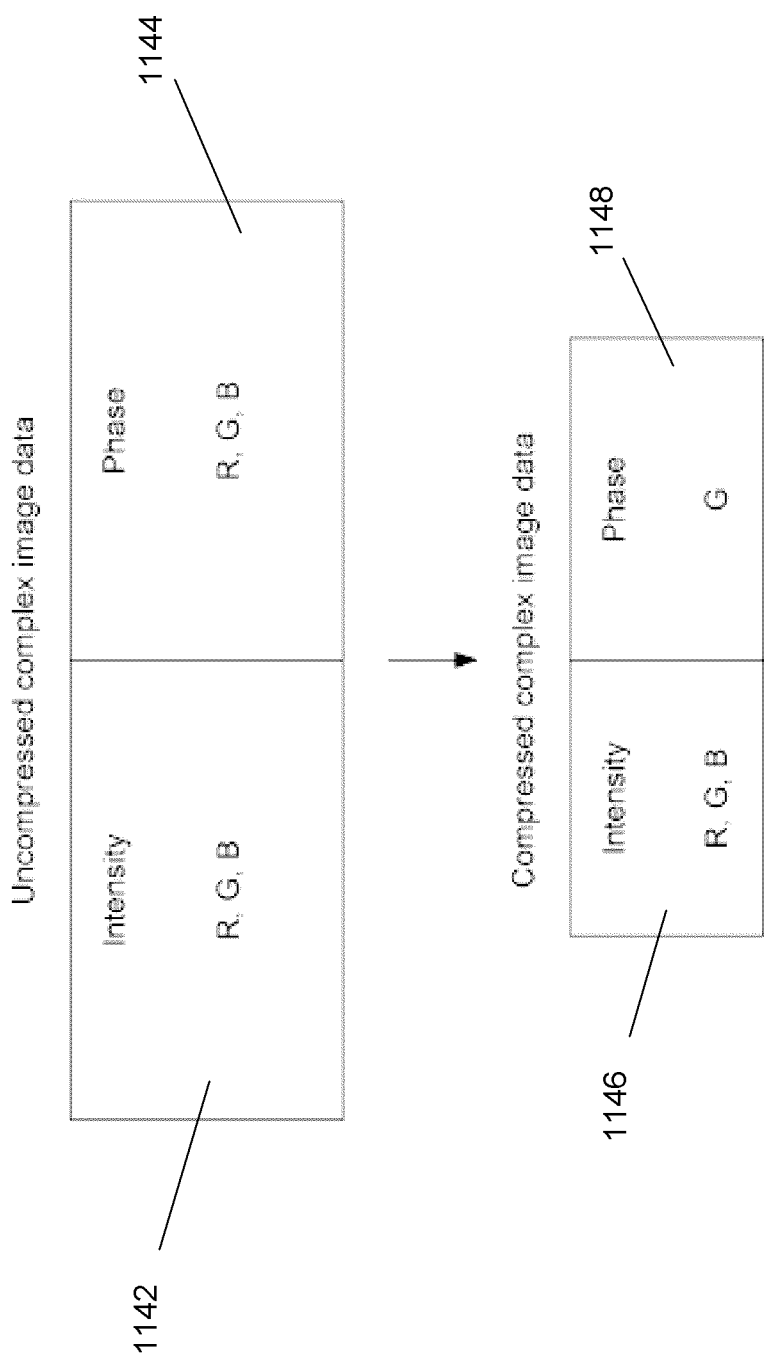
FIG. 21 schematically illustrates a process of compressing intensity and phase information of a complex image.

FIG. 21 illustrates a method that can be used in compressing complex image data containing amplitude and phase. As illustrated, the initial uncompressed complex image data comprises different wavelength or color components. In the example shown, these wavelength or color components comprise red (R), green (G), and blue (B) components, although other colors and wavelengths may be used. Accordingly, a portion of the uncompressed complex image data comprises intensity values for red, green and blue color components as represented by block 1142 and a portion of the uncompressed complex image data comprises phase values for red, green and blue color components as represented by block 1144.

As illustrated in FIG. 21, this uncompressed complex image data is compressed. In this particular example, the uncompressed intensity values for red, green and blue color components as represented by block 1142 are compressed yielding compressed intensity values for R, G, B, color components represented by block 1146. However, the uncompressed phase value for less than all of the red, green and blue color components are compressed. For example, as shown in FIG. 21, the uncompressed phase value for the green color component is compressed yielding compressed phase values for the green color component as represented by block 1148. The phase values for the other color components, here red and blue, are removed from the complex data values, for example, that are bundled together for storage and/or transport.

The compressed complex data can be uncompressed for use. For example the compressed intensity values for the red, green, and blue color components as well as the compressed phase value for the green color component can be uncompressed. In some embodiments, the phase values for the other color components, red and blue in this example, may be produced from the phase value of the green color component.

The phase information can be more difficult to compress than the amplitude portion of the complex image data. Accordingly, less than all of the original parts (e.g., color components) of the phase information are compressed. In some embodiments, it may be possible to retain sufficient phase information from the compressed color component so that when uncompressed, the phase information for the other color components (e.g., the "R" and "B" color components) is approximated sufficiently well for 3-D applications.

Although FIG. 21 refers to amplitude and phase, the data compressed may be representative of amplitude and phase. Likewise, although red green and blue are used as example color components, more or less color components may be used and different colors may be employed.

Figure 22:
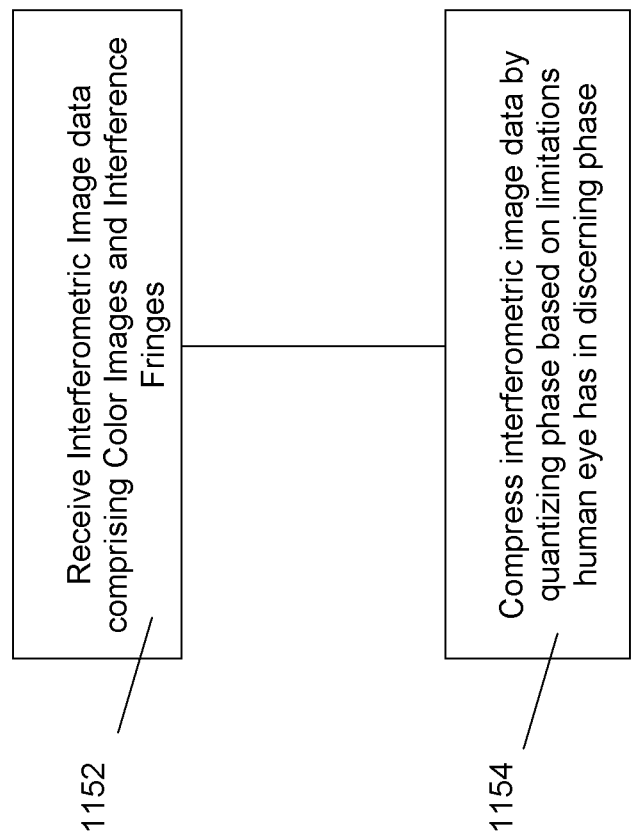
FIG. 22 schematically illustrates a process of compressing data by quantizing phase based on limitations of the human eye to discriminate between small phase differences.

Another method of compressing complex image data containing amplitude and phase is illustrated by the flow chart shown in FIG. 22. In this method, interferometric image data is received as represented by block 1152. In this example, the interferometric image data comprises color images and interference fringes. Accordingly, the interferometric image data comprises complex image data. In particular, in some embodiments intensity images may be obtained for different color components (e.g., red, green, and blue). Additionally, in some embodiments phase information for different wavelengths may be obtained from the interference fringes. The interferometric image data can be compressed by quantizing phase as represented by block 1154. For example, phase space averaging may be conducted on visually flat areas. In some cases, this phase compression could be linked to the intensity compression.

The phase may also be quantized and limited to certain discrete levels. In some embodiments, the number of levels and spacing between the levels may be based potentially on the human visual system. In particular, the human visual system has limited ability to discern small variations in distance. Accordingly, the phase value need not be recorded to great precision and instead a limited number of discrete phase levels can be used to represent the measured phase. For example, 4, 6, 8, or 10 discrete values of possible phase between 0 and $\pi$ may be employed in some cases. More or less number of discrete phase values or levels may be used. If for example, 4 levels are used, the levels may correspond to 0, $\pi/4$, $\pi/2$, and $3\pi/4$. Other values of phase would be approximated by one of these levels if a quantization compression process is used. For example, $0.1\pi$ may be represented by 0 and $0.8\pi$ may be represented by $3\pi/4$. The quantization approach may vary, for example, different number of levels may be used and how the measured value is matched to a level may vary. For example, the approach may be to round to the closest level, or move up to the closest level greater than the value, etc.

The number of levels of phase may be based on limitations of the human eye has in discerning phase variation, which may vary depending on the context. For example, the human eye will be particularly limited in ascertaining small differences in distance for surfaces located at a large distance from the eye. A smaller number of phase levels (more widely space levels) would therefore be needed for images of objects distant from the eye. In contrast, the eye would be more adept at discerning variations in distance for surfaces close-up. Accordingly, close-up views of objects may include more phase levels.

Other methods for compressing the phase may also be employed. In many of these approaches if both the phase and amplitude are compressed, phase is compressed in a non-identical manner than the amplitude. However, many methods for compressing phase and amplitude are possible. The methods used to compress phase may be the same as or different as those used for compressing the amplitude. The compression of phase may be linked to the compression of amplitude in some embodiments, however, the phase and amplitude need not be linked. Other approaches than those discussed herein may be used to compress either phase and amplitude or both.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In addition, while specific embodiments of, and examples of systems and methods for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for formatting data usable for 3-D image formation, the method comprising:
   receiving data based on one or more images, the data including information representative of an interference of an optical intensity image of the object and a reference beam, phase and amplitude information included in said data or being extractable from said data, wherein the data includes a plurality of color components; and
   performing data compression on the data so as to reduce bits used to represent said data, said data compression compressing at least one of said phase and amplitude,
   wherein said phase is compressed in a non-identical manner than said amplitude if both said phase and amplitude are compressed,
   wherein if said phase is compressed then less than all of the plurality of color components present in the phase are compressed.

2. The method of claim 1, wherein said data comprises an image including a fringe pattern.

3. The method of claim 1, wherein said the data includes information representative of an interference of an optical intensity image of the object obtained through an imaging pupil and a reference beam.

4. The method of claim 1, wherein said data comprises phase and amplitudes.

5. The method of claim 1, further comprising using an optical sensor to capture at least one of said one or more images of the object.

6. The method of claim 5, further comprising using said optical sensor to capture an interferometric fringe pattern from the object.

7. The method of claim 1, further comprising transmitting said data to a projector configured to project a 3-D image.

8. An apparatus for capturing data usable for 3-D image formation, the apparatus comprising:
   an image acquisition component configured to capture one or more images of an object, at least a portion of the one or more images having depth information; and
   one or more processors configured to generate data based on the one or more images, the data including information representative of an interference of an optical intensity image of the object and a reference beam, phase and amplitude information included in said data or being extractable from said data,
   wherein said processor is further configured to perform data compression on the data so as to reduce bits used to represent said data, said data compression compressing at least one of said phase and amplitude, said phase being compressed in a non-identical manner than said amplitude if both said phase and amplitude are compressed,
   wherein if said phase is compressed, then the phase is compressed by quantizing the phase based on limitations of the human eye to discriminate between small phase differences.

9. The apparatus of claim 8, wherein said image acquisition component is configured to interfere an optical intensity distribution from the object with a reference beam to obtain an interference pattern.

10. The apparatus of claim 9, wherein said image acquisition component is configured to interfere an optical intensity image of the object obtained through an imaging pupil and a reference beam.

11. The apparatus of claim 8, wherein said image acquisition component and one or more processors are configured to provide said data using a method other than employing optical interference of an optical intensity image of the object and a reference beam.

12. The apparatus of claim 8, wherein said data comprises an image including a fringe pattern.

13. The apparatus of claim 8, wherein said data comprises phase and amplitudes.

14. The apparatus of claim 8, wherein said image acquisition component comprises one or more devices selected from the group consisting of a camera, an interferometer, a range finder, a time-of-flight measurement device, LIDAR, and RULLI or RULLI-like device.

15. An apparatus for displaying a 3-D image, the apparatus comprising:
  one or more processors configured to receive data based on one or more images, said data including information representative of an interference of an optical intensity image of the object and a reference beam, the data being compressed so as to reduce bits used to represent said data, said one or more processors configured to uncompress said data; and
  a display configured to provide a 3-D image based on said uncompressed data,
  wherein phase and amplitude information is included in said uncompressed data or is extractable from said uncompressed data, said data compression compressing at least one of said phase and amplitude, said phase being compressed in a non-identical manner than said amplitude if both said phase and amplitude are compressed,
  wherein if said phase is compressed, then the phase is compressed by quantizing the phase based on limitations of the human eye to discriminate between small phase differences.

16. The apparatus of claim 15, wherein said display comprises a spatial light modulator configured to produce an intensity pattern based on said uncompressed data.

17. The apparatus of claim 15, wherein said display comprises a phase spatial light modulator configured to selectively modulate phase based on said phase obtained from said uncompressed data.

18. The apparatus of claim 15, wherein said the data includes information representative of an interference of an optical intensity image of the object obtained through an imaging pupil and a reference beam.

19. The apparatus of claim 15, wherein said data comprises phase and amplitudes.

20. The method of claim 1, wherein the amplitude is compressed to yield compressed amplitude that includes all of the color components.

21. The method of claim 1, wherein the phase is compressed by including less than all of the color components.

22. The method of claim 1, wherein the phase is compressed.

23. The apparatus of claim 8, wherein the phase is compressed.

24. The apparatus of claim 15, wherein the phase is compressed.

* * * * *